US008025949B2

(12) United States Patent
Levit et al.

(10) Patent No.: US 8,025,949 B2
(45) Date of Patent: *Sep. 27, 2011

(54) HONEYCOMB CONTAINING POLY(PARAPHENYLENE TEREPHTHALAMIDE) PAPER WITH ALIPHATIC POLYAMIDE BINDER AND ARTICLES MADE THEREFROM

(75) Inventors: Mikhail R. Levit, Glen Allen, VA (US); Subhotosh Khan, Midlothian, VA (US); Gary Lee Hendren, Richmond, VA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/639,457

(22) Filed: Dec. 15, 2006

(65) Prior Publication Data
US 2008/0145596 A1 Jun. 19, 2008

(51) Int. Cl.
*B32B 3/12* (2006.01)
*B32B 5/06* (2006.01)
*B32B 5/16* (2006.01)
*E04B 1/74* (2006.01)

(52) U.S. Cl. .......... 428/116; 428/327; 52/302.1

(58) Field of Classification Search .......... None
See application file for complete search history.

(56) References Cited

U.S. PATENT DOCUMENTS

| | | | |
|---|---|---|---|
| 2,999,788 A | 9/1961 | Morgan | |
| 3,519,510 A | 7/1970 | Ardolino et al. | |
| 3,617,416 A * | 11/1971 | Kromrey | 156/173 |
| 3,756,908 A | 9/1973 | Gross | |
| 3,767,756 A | 10/1973 | Blades | |
| 3,869,429 A | 3/1975 | Blades | |
| 3,869,430 A | 3/1975 | Blades | |
| 4,374,978 A * | 2/1983 | Fujiwara et al. | 528/348 |
| 4,698,267 A | 10/1987 | Tokarsky | |
| 4,729,921 A | 3/1988 | Tokarsky | |

(Continued)

FOREIGN PATENT DOCUMENTS
EP 0 467 286 1/1992
(Continued)

OTHER PUBLICATIONS

A. Kelly, F.E. Buresch, R.H. Biddulph. Philosophical Transactions of the Royal Society of London. Series A, Mathematical and Physical Sciences, vol. 322. No. 1567, Technology in the 1990s: The Promise of Advanced Materials, (Jul. 27, 1987), pp. 409-423.*

(Continued)

*Primary Examiner* — David Sample
*Assistant Examiner* — Nicole Gugliotta

(57) ABSTRACT

This invention relates to a honeycomb having cells of paper, comprising by weight 3 to 30 parts by weight aliphatic polyamide binder, and 70 to 97 parts of a poly(paraphenylene terephthalamide) fiber having a modulus of 600 grams per denier (550 grams per dtex) or greater, based on the aliphatic polyamide binder and PPD-T fiber in the paper. In another embodiment, the honeycomb is made from paper comprising by weight 30 to 50 parts aliphatic polyamide binder, and 50 to 70 parts of a poly(paraphenylene terephthalamide) fiber having a modulus of 600 grams per denier (550 grams per dtex) or greater, based on the aliphatic polyamide binder and PPD-T fiber in the paper. Both papers have an average specific tensile index of 60 (lbs/in)/opsy (310 Nm/g) or greater. Articles made from the honeycombs include a panel or an aerodynamic structure.

9 Claims, 2 Drawing Sheets

U.S. PATENT DOCUMENTS

| | | | |
|---|---|---|---|
| 5,026,456 A | | 6/1991 | Hesler et al. |
| 5,137,768 A | | 8/1992 | Lin |
| 5,217,556 A | | 6/1993 | Fell |
| 5,223,094 A | | 6/1993 | Kirayoglu et al. |
| 5,314,742 A | | 5/1994 | Kirayoglu et al. |
| 5,514,444 A | | 5/1996 | Buyny et al. |
| 5,543,199 A | * | 8/1996 | Fell ............... 428/116 |
| 5,589,016 A | * | 12/1996 | Hoopingarner et al. ........ 156/87 |
| 5,723,568 A | | 3/1998 | Shimada et al. |
| 5,789,059 A | | 8/1998 | Nomoto |
| 5,833,807 A | | 11/1998 | Ramachandran et al. |
| 6,458,244 B1 | | 10/2002 | Wang et al. |
| 6,544,622 B1 | | 4/2003 | Nomoto |
| 6,551,456 B2 | | 4/2003 | Wang et al. |
| 6,929,848 B2 | | 8/2005 | Samuels et al. |
| 2003/0082974 A1 | | 5/2003 | Samuels et al. |
| 2005/0230072 A1 | * | 10/2005 | Levit ............... 162/146 |
| 2008/0145601 A1 | * | 6/2008 | Levit et al. ............... 428/116 |

FOREIGN PATENT DOCUMENTS

| | | |
|---|---|---|
| EP | 0 722 987 | 7/1996 |
| EP | 0722987 A1 | 7/1996 |
| WO | WO 95/14815 | 6/1995 |
| WO | WO 96/00323 | 1/1996 |
| WO | WO 2008/076397 | 6/2008 |

OTHER PUBLICATIONS

Gould Paper Testing (http://www.gouldpaper.com/GOULDWEB/TESTING.html).*

Handbook of Fiber Chemistry, 3rd Edition. (pp. 94-95) http://books.google.com/books?id=nqo4OrP5OxsC&printsec=frontcover#PPP1,M1.*

Way Back Machine Search Results for http://www/gouldpaper.com/GOULDWEB/TESTING.html.* http://dictionary.reference.com/browse/tape (Feb. 2007).*

* cited by examiner

HONEYCOMB CONTAINING POLY(PARAPHENYLENE TEREPHTHALAMIDE) PAPER WITH ALIPHATIC POLYAMIDE BINDER AND ARTICLES MADE THEREFROM

BACKGROUND OF THE INVENTION

1. Field of the Invention

This invention relates to an improved high performance honeycomb made from a paper containing poly(paraphenylene terephthalamide) fiber and aliphatic polyamide binder and articles made from the honeycomb.

2. Description of Related Art

U.S. Pat. No. 5,137,768 to Lin; U.S. Pat. No. 5,789,059 to Nomoto; and U.S. Pat. No. 6,544,622 to Nomoto disclose honeycombs made from sheets of high modulus para-aramid materials. These honeycombs are highly prized for structural applications due to their high stiffness and high strength-to-weight ratio. Generally these honeycombs are made from papers comprising para-aramid floc, pulp, and/or other fibrous materials plus a binder. The modulus of the final honeycomb is directly related to the proportion of para-aramid fiber in the paper composition. At the same time, the proportion of para-aramid fiber in the paper is limited to a certain degree because a binder must also be present to provide the paper with adequate strength to process the paper into honeycomb. Specifically, it is believed that adhesion of the binder to the fiber in the paper is critically important in manufacture of superior honeycomb. If the selected binder for the paper does not adhere well with the fiber, the resulting paper will not have adequate strength to survive the manufacture of the honeycomb, or the resulting honeycomb will not function as a unified structure. Simply increasing the quantity of a poor binder in the paper will not adequately compensate for this lack of adhesion.

What is needed therefore is a binder that has superior adhesion to the fiber and provides a paper having adequate strength for processing. Such a binder also provides more flexibility in designing a honeycomb in that it can provide a route to minimize the total amount of binder in the paper composition and therefore increase the amount of para-aramid fiber in the paper composition and honeycomb; or if excess binder is used, reduces or eliminates the need for a thermoset matrix resin in the honeycomb.

BRIEF SUMMARY OF THE INVENTION

This invention relates to a honeycomb having cell walls comprising paper having an average specific tensile index of 60 (lbs/in)/opsy (310 Nm/g) or greater; the paper comprising 3 to 30 parts by weight aliphatic polyamide binder and 70 to 97 parts by weight poly(paraphenylene terephthalamide) fiber having a modulus of 600 grams per denier (550 grams per dtex) or greater, based on the total amount of aliphatic polyamide binder and PPD-T fiber in the paper; and voids in the paper being filled with thermoset resin.

This invention also relates to a honeycomb having cell walls comprising paper having an average specific tensile index of 60 (lbs/in)/opsy (310 Nm/g) or greater; the paper comprising 30 to 50 parts by weight aliphatic polyamide binder and 50 to 70 parts by weight poly(paraphenylene terephthalamide) fiber having a modulus of 600 grams per denier (550 grams per dtex) or greater, based on the total amount of aliphatic polyamide binder and PPD-T fiber in the paper; and voids in the paper being filled with excess aliphatic polyamide binder.

One embodiment includes articles comprising the aforesaid honeycombs, with such articles including a panel or an aerodynamic structure.

DETAILED DESCRIPTION OF THE INVENTION

This invention relates to a honeycomb made from a paper comprising poly(paraphenylene terephthalamide) (PPD-T) fiber and aliphatic polyamide binder. PPD-T paper made with aliphatic polyamide binder is believed to have a higher strength per unit amount of binder, or higher specific tensile index, when compared to other thermoplastic binders.

Figure 1A:
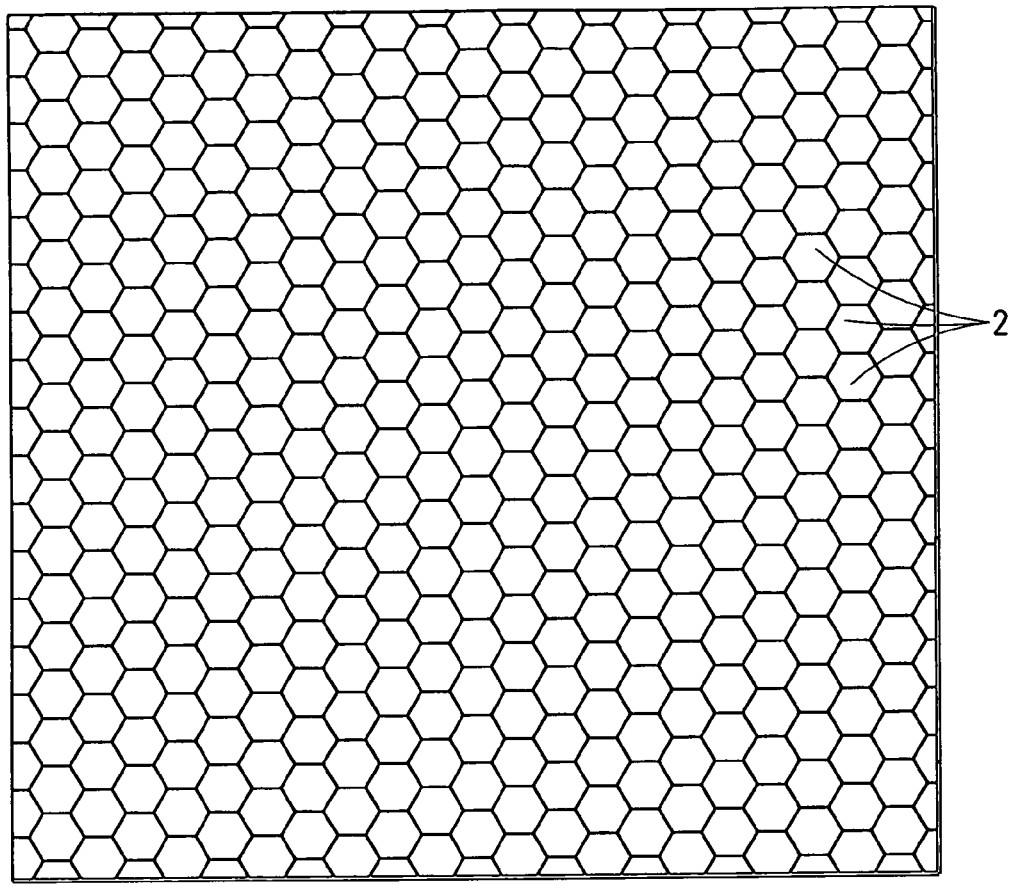
FIGS. 1a and 1b are representations of views of a hexagonal shaped honeycomb.
Figure 1B:
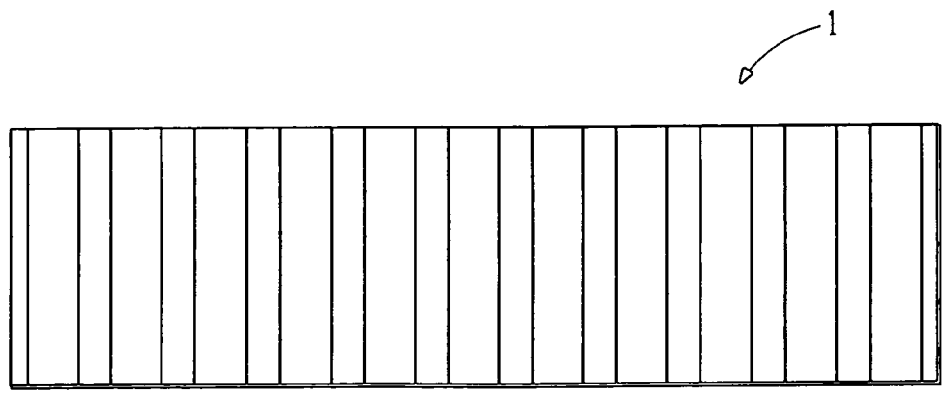
Figure 2:
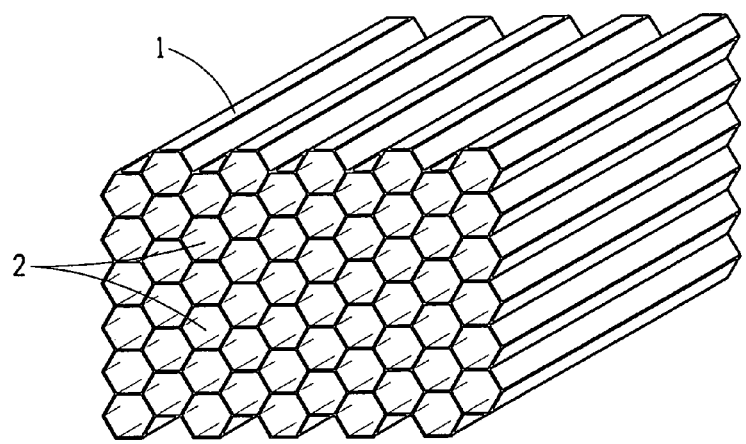
FIG. 2 is a representation of another view of a hexagonal cell shaped honeycomb.

FIG. 1a is one illustration of a honeycomb. FIG. 1b is an orthogonal view of the honeycomb shown in FIG. 1a and FIG. 2 is a three-dimensional view of the honeycomb. Shown is honeycomb 1 having hexagonal cells 2. Hexagonal cells are shown; however, other geometric arrangements are possible with square and flex-core cells being the other most common possible arrangements. Such cell types are well known in the art and reference can be made to *Honeycomb Technology* by T. Bitzer (Chapman & Hall, publishers, 1997) for additional information on possible geometric cell types.

In some embodiments, the honeycomb is made from a paper containing 3 to 30 parts by weight aliphatic polyamide binder. In these embodiments, also present in the honeycomb is a thermoset resin that fully impregnates, saturates, and/or coats the cell walls of the honeycomb. This fills voids in the paper with thermoset resin, and preferably fills a substantial amount of voids in the paper. It should be recognized that complete filling of all voids is a desired result but difficult to achieve. Therefore it is desired that an adequate number of the voids in the paper in the cell walls are filled to provide the desired amount of stiffness or mechanical integrity to the final honeycomb. The resin is then further crosslinked or cured to realize the final properties (stiffness and strength) of the honeycomb. In some embodiments these structural resins include epoxy resins, phenolic resins, acrylic resins, polyimide resins, and mixtures thereof.

In some embodiments the honeycomb is made from a paper containing 30 to 50 parts by weight aliphatic polyamide binder. This paper is believed to have excess aliphatic polyamide binder; that is, there is more binder present in the paper than is needed to simply bind the fibers together. In this embodiment, subsequent impregnation, saturation, and/or coating of the honeycomb by thermoset resin is not needed or the amount of thermoset resin can be substantially reduced. The application of heat to the aliphatic binder-rich honeycomb allows a portion of the binder to flow and fill voids in the paper. As before, it should be recognized that complete filling of all voids is a desired result but difficult to achieve. Therefore it is desired that an adequate number of the voids in the paper in the cell walls are filled with the aliphatic polyamide to provide the desired amount of stiffness or mechanical integrity to the final honeycomb.

The cell walls of the honeycomb are formed from a paper comprising a PPD-T fiber and an aliphatic polyamide binder. In some embodiments the term paper is employed in its normal meaning and refers to a nonwoven sheet prepared using conventional wet-lay papermaking processes and equipment. However, the definition of paper in some embodiments includes, in general, any nonwoven sheet that requires a binder material and has properties sufficient to provide an adequate honeycomb structure.

In some embodiments, where the honeycomb will have an additional thermoset matrix resin, the paper used in the honeycomb comprises 3 to 30 parts by weight aliphatic polyamide binder, and 70 to 97 parts by weight of a PPD-T fiber, based on the total amount of aliphatic polyamide binder and PPD-T fiber in the paper. In some preferred embodiments the paper comprises 3 to 20 parts by weight of the aliphatic binder and 80 to 97 parts by weight of the PPD-T fiber.

In some other embodiments, where the honeycomb will not necessarily require the use of an additional thermoset matrix resin, the paper used in the honeycomb comprises 30 to 50 parts by weight of the aliphatic polyamide binder, and 50 to 70 parts by weight of the PPD-T fiber, based on the total amount of aliphatic polyamide binder and PPD-T fiber in the paper. In some preferred embodiments the paper comprises 40 to 50 parts by weight of the aliphatic binder and 50 to 60 parts by weight of the PPD-T fiber.

The paper has an average specific tensile index of 60 (pounds per inch)/(ounces per square yard) or 310 Nm/g or greater. Specific tensile index is a measure of the tensile strength of the paper, measured on a unit width of paper and normalized for basis weight and percent binder. The average specific tensile index is the average of the specific tensile index as measured in the machine direction (MD) of the paper and the specific tensile index as measured in the cross direction (XD) of the paper. In some embodiments, the paper has an average specific tensile index of 75 (lbs/in)/opsy (390 Nm/g) or greater.

The thickness of the paper used in this invention is dependent upon the end use or desired properties of the honeycomb and in some embodiments is typically from 1 to 5 mils (25 to 130 micrometers) thick. In some embodiments, the basis weight of the paper is from 0.5 to 6 ounces per square yard (15 to 200 grams per square meter). As the basis weight of the paper increases, one skilled in the art understands that the percentage of binder needed in the paper for adequate strength also increases; therefore if the binder has superior adhesion to the fiber, less binder is needed per unit area or unit weight of paper.

The paper can also include inorganic particles and representative particles include mica, vermiculite, and the like; the addition of these particles can impart properties such as improved fire resistance, thermal conductivity, dimensional stability, and the like to the paper and the final honeycomb.

The paper used in this invention can be formed on equipment of any scale, from laboratory screens to commercial-sized papermaking machinery, including such commonly used machines as Fourdrinier or inclined wire paper machines. A typical process involves making a dispersion of PPD-T fibrous material such as floc and/or pulp and aliphatic polyamide binder material in an aqueous liquid, draining the liquid from the dispersion to yield a wet composition and drying the wet paper composition. The dispersion can be made either by dispersing the fibers and then adding the binder material or by dispersing the binder material and then adding the fibers. The final dispersion can also be made by combining a dispersion of fibers with a dispersion of the binder material; the dispersion can optionally include other additives such as inorganic materials. If the aliphatic polyamide binder material is a fiber, the fiber can be added to the dispersion by first making a mixture with PPD-T fibers, or the fiber can be added separately to the dispersion. The concentration of all fibers in the dispersion can range from 0.01 to 1.0 weight percent based on the total weight of the dispersion. The concentration of a binder material in the dispersion can be up to 50 weight percent based on the total weight of solids. In a typical process, the aqueous liquid of the dispersion is generally water, but may include various other materials such as pH-adjusting materials, forming aids, surfactants, defoamers and the like. The aqueous liquid is usually drained from the dispersion by conducting the dispersion onto a screen or other perforated support, retaining the dispersed solids and then passing the liquid to yield a wet paper composition. The wet composition, once formed on the support, is usually further dewatered by vacuum or other pressure forces and further dried by evaporating the remaining liquid.

In one preferred embodiment, PPD-T fibrous material and aliphatic polyamide binder, such as a mixture of short fibers or short fibers and binder particles, can be slurried together to form a mix that is converted to paper on a wire screen or belt. Reference is made to United States patent and patent application Nos. U.S. Pat. No. 3,756,908 to Gross; U.S. Pat. Nos. 4,698,267 and 4,729,921 to Tokarsky; U.S. Pat. No. 5,026,456 to Hesler et al.; U.S. Pat. No. 5,223,094 to Kirayoglu et al.; U.S. Pat. No. 5,314,742 to Kirayoglu et al.; U.S. Pat. Nos. 6,458,244 and 6,551,456 to Wang et al.; and U.S. Pat. No. 6,929,848 and 2003-0082974 to Samuels et al. for illustrative processes for forming papers from various types of fibrous material and binders.

Once the paper is formed, it is preferably hot calendered. This can increase the density and strength of the paper. Generally one or more layers of the paper are calendered in the nip between metal-metal, metal-composite, or composite-composite rolls. Alternatively, one or more layers of the paper can be compressed in a platen press at a pressure, temperature, and time that are optimal for a particular composition and final application. Calendering paper in this manner also decreases the porosity of the formed paper, and in some preferred embodiments the paper used in the honeycomb is calendered paper. Heat-treatment of the paper, such as from radiant heaters or un-nipped rolls, as an independent step before, after, or instead of calendering or compression, can be conducted if strengthening or some other property modification is desired without, or in addition to, densification.

The paper can have a Gurley porosity of 2 seconds or greater. In some embodiments the papers have Gurley porosity of from 2 to about 20 seconds, and in some preferred embodiments the papers have a Gurley porosity of about 5 to 10 seconds. For those embodiments that include the impregnation, saturation, and/or coating by a thermoset resin, paper having a porosity of less than 2 seconds is believed to allow uncontrolled impregnation of the paper, while papers having a porosity of more than 20 seconds are not as desirable because it is believed that in some cases the low porosity will retard structural resin impregnation of the paper to the extent that the rate of dipping/impregnation process of the honeycomb is made not very practical.

The honeycomb comprises PPD-T fibers having a tensile or Young's modulus of 600 grams per denier (550 grams per dtex) or greater. The high modulus of the PPD-T fiber provides necessary stiffness to the final honeycomb structure and corresponding articles. In a preferred embodiment, the Young's modulus of the fiber is 900 grams per denier (820 grams per dtex) or greater. In one preferred embodiment, the fiber tenacity is at least 21 grams per denier (19 grams per dtex) and its elongation is at least 2% so as to provide a high level of mechanical properties to the final honeycomb structure.

The PPD-T fibers can be in the form of a floc or a pulp or a mixture thereof. By "floc" is meant fibers having a length of 2 to 25 millimeters, preferably 3 to 7 millimeters and a diameter of 3 to 20 micrometers, preferably 5 to 14 micrometers. Floc is generally made by cutting continuous spun filaments into specific length pieces. If the floc length is less than 2 millimeters, it is generally too short to provide a paper with adequate strength; if the floc length is more than 25 millimeters, it is very difficult to form uniform wet-laid webs. Floc having a diameter of less than 5 micrometers, and especially less than 3 micrometers, is difficult to produce with adequate cross sectional uniformity and reproducibility; if the floc diameter is more than 20 micrometers, it is very difficult to form uniform papers of light to medium basis weights.

The term "pulp", as used herein, means particles of PPD-T material having a stalk and fibrils extending generally therefrom, wherein the stalk is generally columnar and about 10 to 50 micrometers in diameter and the fibrils are fine, hair-like members generally attached to the stalk measuring only a fraction of a micrometer or a few micrometers in diameter and about 10 to 100 micrometers long.

This invention utilizes a paper made with the para-aramid fiber poly(paraphenylene terephthalamide), which is also referred to herein as PPD-T. As employed herein the term aramid means a polyamide wherein at least 85% of the amide (—CONH—) linkages are attached directly to two aromatic rings. "Para-aramid" means the two rings or radicals are para oriented with respect to each other along the molecular chain. Additives can be used with the aramid. In fact, it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride of the aramid. Methods for making poly(paraphenylene terephthalamide) fibers useful in this invention are generally disclosed in, for example, U.S. Pat. Nos. 3,869,430; 3,869,429; and 3,767,756. Such aromatic polyamide fibers and various forms of these fibers are available from E. I. du Pont de Nemours and Company, Wilmington, Del. under the trademark Kevlar® fibers and from Teijin, Ltd., under the trademark Twaron®.

The paper used in the honeycomb has aliphatic polyamide binder. Such binders are thermoplastic, and thermoplastic is meant to have its traditional polymer definition; these materials flow in the manner of a viscous liquid when heated and solidify when cooled and do so reversibly time and time again on subsequent heating and cooling steps. In some embodiments, the aliphatic polyamide binder has a melting point of from 120° C. to 350° C. In some other preferred embodiments the melting point of the aliphatic polyamide is from 180° to 300° C. In some other preferred embodiments the melting point of the aliphatic polyamide is 220° to 250° C. While papers can be made with aliphatic polyamide binder having a melt point lower than 120° C., this paper can be susceptible to undesirable melt flow, sticking, and other problems after paper manufacture. For example, during honeycomb manufacture, after node line adhesive is applied to the paper, generally heat is applied to remove solvent from the adhesive. In another step, the sheets of paper are pressed together to adhere the sheets at the node lines. During either of these steps, if the paper has a low melt point aliphatic polyamide binder, that material can flow and undesirably adhere the paper sheets to manufacturing equipment and/or other sheets. Therefore, preferably the aliphatic polyamide binders used in the papers can melt or flow during the formation and calendering of the paper, but do not appreciably melt or flow during the manufacture of honeycomb. Aliphatic polyamide binders having a melt point above 350° C. are undesired because they require such high temperatures to soften that other components in the paper may begin to degrade during paper manufacture. In those embodiments where more than one type of aliphatic polyamide binder is present then at least 30% of the aliphatic polyamide binder should have melting point not above 350° C.

The aliphatic polyamide binder binds the PPD-T fiber in the paper used in the honeycomb. In some preferred embodiments the aliphatic polyamide binder is in the form of binder fibers or floc; however, the aliphatic polyamide binder can be in the form of flakes, particles, pulp, fibrids, or mixtures of any of these. When incorporated into papers, in some embodiments these materials can form discrete film-like particles having a film thickness of about 0.1 to 5 micrometers and a minimum dimension perpendicular to that thickness of at least 30 micrometers. By "discrete" it is meant the particles form islands of film-like particles in a sea of PPD-T fibers, and while there may be some overlap of film-like particles they do not form a continuous film of aliphatic polyamide binder in the plane of the paper. This is useful when the honeycomb is to be impregnated or dipped in a thermoset or matrix resin, in that it allows relatively full movement of any matrix resins that are used to impregnate the honeycomb cell walls made from the paper. The presence and amount of such particles in the paper and the honeycomb can be determined by optical methods, such as by inspection of a sample of paper or honeycomb suitably prepared and viewed under adequate power to measure the size of the particles and count the average number of particles in a unit sample.

In those embodiments wherein excess aliphatic polyamide binder is to be the matrix resin, the aliphatic polyamide occupies a larger domain in the paper and discrete film-like particles are less likely to be formed. This larger domain of aliphatic polyamide in the paper is then available to flow when heated and can uniformly fill voids and coat surfaces of the paper.

The term "fibrids" as used herein, means a very finely-divided polymer product of small, filmy, essentially two-dimensional, particles known having a length and width on the order of 100 to 1000 micrometers and a thickness only on the order of 0.1 to 1 micrometer. Fibrids are typically made by streaming a polymer solution into a coagulating bath of liquid that is immiscible with the solvent of the solution. The stream of polymer solution is subjected to strenuous shearing forces and turbulence as the polymer is coagulated. Exemplary methods of preparing fibrids are disclosed in U.S. Pat. No. 2,999,788.

The aliphatic polyamide binder useful in this invention includes any type of fiber containing nylon polymer or copolymer. Nylons are long chain synthetic polyamides having recurring amide groups (—NH—CO—) as an integral part of the polymer chain, and two common examples of nylons are nylon 66, which is polyhexamethylenediamine adipamide, and nylon 6, which polycaprolactam. Other nylons can include nylon 11, which is made from 11-aminoundecanoic acid; and nylon 610, which is made from the condensation product of hexamethylenediamine and sebacic acid. In some preferred embodiments the aliphatic polyamide is nylon 610, nylon 6, nylon 66 or mixtures thereof.

Other materials, particularly those often found in or made for use in thermoplastic compositions may also be present in the aliphatic polyamide binder. These materials should preferably be chemically inert and reasonably thermally stable under the operating environment of the honeycomb. Such materials may include, for example, one or more of fillers, reinforcing agents, pigments and nucleating agents. Other polymers may also be present, thus forming polymer blends. In some embodiments, other polymers are present it is preferred that they are less than 25 weight percent of the composition. In another preferred embodiment, other polymers are not present in the aliphatic polyamide binder except for a small total amount (less than 5 weight percent) of polymers such as those that function as lubricants and processing aids.

One embodiment of the invention is an article comprising a honeycomb made from a paper comprising PPD-T fiber and aliphatic polyamide binder. In some preferred embodiments the aliphatic polyamide binder is at least partly present in the paper in the form of discrete film-like particles. When used in articles the honeycomb can function, if desired, as a structural component. In some preferred embodiments, the honeycomb is used at least in part in an aerodynamic structure. In some embodiments, the honeycomb has use as a structural component in such things as overhead storage bins and wing to body fairings on commercial airliners. Due to the lightweight structural properties of honeycomb, one preferred use is in aerodynamic structures wherein lighter weights allow savings in fuel or the power required to propel an object through the air.

Figure 3:
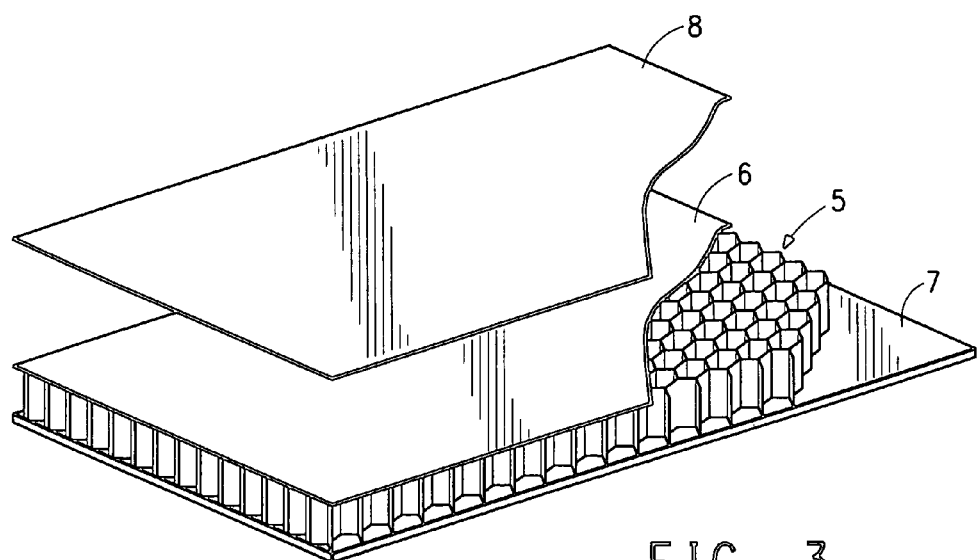
FIG. 3 is an illustration of honeycomb provided with facesheet(s).

Another embodiment of the invention is a panel comprising a honeycomb made from a paper comprising PPD-T fiber and aliphatic polyamide binder. One or more facesheets may be attached to the face of the honeycomb to form a panel. Facesheets provide integrity to the structure and help to realize the mechanical properties of the honeycomb core. Also, facesheets can seal the cells of the honeycomb to prevent material from the cells, or the facesheets can help retain material in the cells. FIG. 3 shows honeycomb 5 having a facesheet 6 attached to one face by use of an adhesive. A second facesheet 7 is attached to the opposing face of the honeycomb, and the honeycomb with the two opposing facesheets attached form a panel. Additional layers of material 8 can be attached to either side of the panel as desired. In some preferred embodiments face sheets applied to both sides of the honeycomb contain two layers of material. In some preferred embodiments, the facesheet comprises a woven fabric or a crossplied unidirectional fabric. In some embodiments crossplied unidirectional fabric is a 0/90 crossply. If desired, the facesheet can have a decorative surface, such as embossing or other treatment to form an outer surface that is pleasing to the eye. Fabrics containing glass fiber and/or carbon and/or other high strength and PPD-T fibers are useful as facesheet material.

In some embodiments the honeycomb can be made by methods such as those described in U.S. Pat. Nos. 5,137,768; 5,789,059; 6,544,622; 3,519,510; and 5,514,444. These methods for making honeycomb generally require the application or printing of a number of lines of adhesive (node lines) at a certain width and pitch on one surface of the PPD-T paper, followed by drying of the adhesive. Typically the adhesive resin is selected from epoxy resins, phenolic resins, acrylic resins, polyimide resins and other resins, however, it is preferred that a thermoset resin be used.

After application of node lines, the PPD-T paper is cut at a predetermined interval to form a plurality of sheets. The cut sheets are piled one on top of the other such that each of the sheets is shifted to the other by half a pitch or a half the interval of the applied adhesive. The piled PPD-T fiber-containing paper sheets are then bonded to each other along the node lines by the application of pressure and heat. The bonded sheets are then pulled apart or expanded in directions perpendicular to the plane of the sheets to form a honeycomb having cells. Consequently, the formed honeycomb cells are composed of a planar assembly of hollow, columnar cells separated by cell walls made of paper sheets that were bonded to each other along a number of lines and which were expanded.

If desired, the honeycomb is then impregnated with a structural resin after it is expanded. Typically this is accomplished by dipping the expanded honeycomb into a bath of thermoset resin, however, other resins or means such as sprays could be employed to coat and fully impregnate and/or saturate the expanded honeycomb cell walls. After the honeycomb is fully impregnated with resin, the resin is then cured by heating the saturated honeycomb to crosslink the resin. Generally this temperature is in the range of 150° C. to 180° C. for many thermoset resins.

In some embodiments the aliphatic polyamide binder can provide the functionality of the structural resin without additional impregnation. In these embodiments the paper is heated or calendered prior to the application of the node lines to cause the aliphatic polyamide binder to fully impregnate and saturate the voids in the paper. In addition it may coat the surface of the paper.

The honeycomb before or after resin impregnation and curing, may be cut into slices. In this way, multiple thin sections or slices of honeycomb can be obtained from a large block of honeycomb. The honeycomb is generally sliced perpendicular to the plane of the cell edges so that the cellular nature of the honeycomb is preserved.

The honeycomb can further comprise inorganic particles, and depending on the particle shape, the particular paper composition, and/or other reasons, these particles can be incorporated into the paper during papermaking (for example, mica flakes, vermiculite, and the like) or into they may be incorporated into the matrix or structural resin (for example, silica powder, metal oxides, and the like.)

Test Methods

Specific tensile index of the paper of this invention is defined as tensile index of the paper in accordance with ASTM D828 divided by weight fraction of the aliphatic polyamide binder in the paper composition per such equation:

Specific Tensile Index=100*(Tensile Index)/$X$

Where $X$ is a weight fraction of the thermoplastic binder in the paper composition in percent.

Gurley porosity for papers is determined by measuring air resistance in seconds per 100 milliliters of cylinder displacement for approximately 6.4 square centimeters circular area of a paper using a pressure differential of 1.22 kPa in accordance with TAPPI T460.

Fiber denier is measured using ASTM D1907. Fiber modulus, tenacity, and elongation are measured using ASTM D885. Paper density is calculated using the paper thickness as measured by ASTM D374 and the basis weight as measured by ASTM D646.

EXAMPLE 1

An aramid/thermoplastic paper having a composition of 52 weight percent para-aramid floc, 18 weight percent para-aramid pulp, 10 weight percent aliphatic polyamide floc, and 20 weight percent aliphatic polyamide fibrids is formed on conventional wet-lay paper forming equipment with a drying section consisting of heated cylinders (cans) having a temperature of about 150° C. The paper therefore contains 70 weight percent PPD-T fiber and 30 weight percent aliphatic polyamide binder.

The para-aramid floc is poly(para-phenylene terephthalamide) fiber sold by E. I. du Pont de Nemours and Company of Wilmington, Del. (DuPont) under the trademark KEVLAR® 49 and has a nominal filament linear density of 1.5 denier per filament (1.7 dtex per filament) and a nominal cut length of 6.7 mm. This fiber has a tensile modulus of about 930 grams/denier (850 grams/dtex), a tensile strength of about 24 grams/denier (22 grams/dtex), and an elongation of about 2.5 percent. The para-aramid pulp is poly(paraphenylene terephthalamide) pulp type 1F361 also sold by DuPont under the KEVLAR® trade name. The aliphatic polyamide floc is nylon 6,6 floc of linear density of 1.8 denier per filament (2 dtex per filament) and nominal cut length of 6.0 mm sold by William Barnet and Son, LLC. The aliphatic polyamide fibrids are obtainable from the process described in U.S. Pat. No. 2,999,788, example 189. The average thickness of a fibrid is about 1 micron, the minimum dimension in the filmy plane of the fibrid is about 40 micrometers, and maximum dimension in plane is about 1.3 mm.

After forming, the paper is calendered in the nip of two metal calender rolls operating at a temperature of 260° C. with a linear pressure in the nip of 1200 N/cm. The final paper has a basis weight of 31 g/m$^2$, a thickness of 1.5 mils (38 micrometers), and a measured Gurley porosity of 5 seconds. An average value of its specific tensile index between machine and cross direction of the sheet is 70 (lb./in.)/(opsy)=360 N*m/g.

A honeycomb is then formed from the calendered paper in the following manner. Node lines of adhesive resin are applied to the paper surface with the width of the lines of adhesive being 1.78 mm. The pitch, or the linear distance between the start of one line and the next line, is 5.33 mm. The adhesive resin is a 50% solids solution comprising 70 parts by weight of an epoxy resin identified as Epon 826 sold by Shell Chemical Co.; 30 parts by weight of an elastomer-modified epoxy resin identified as Heloxy WC 8006 sold by Wilmington Chemical Corp, Wilmington, Del., USA; 54 parts by weight of a bisphenol A-formaldehyde resin curing agent identified as UCAR BRWE 5400 sold by Union Carbide Corp.; 0.6 parts by weight of 2-methylimidazole as a curing catalyst, in a glycol ether solvent identified as Dowanol PM sold by The Dow Chemical Company; 7 parts by weight of a polyether resin identified as Eponol 55-B-40 sold by Miller-Stephenson Chemical Co.; and 1.5 parts by weight of fumed silica identified as Cab-O-Sil sold by Cabot Corp. The adhesive is partially dried on the paper in an oven at 130° C. for 6.5 minutes. No noticeable strike through of the adhesive is observed on the paper.

The sheet with the adhesive node lines is cut parallel to the node lines to form 50 smaller sheets. The cut sheets are stacked one on top of the other, such that each of the sheets is shifted to the other by half a pitch or a half the interval of the applied adhesive node lines. The shift occurs alternately to one side or the other, so that the final stack is uniformly vertical. The stack of sheets is then hot-pressed at 345 kPa at a first temperature of 140° C. for 30 minutes and then at a temperature of 177° C. for 40 minutes, causing the adhesive node lines to soften; once the heat is removed the adhesive then hardens to bond the sheets with each other. Using an expansion frame, the bonded aramid sheets are then expanded in the direction counter to the stacking direction to form cells having a equilateral cross section. Each of the sheets are extended between each other such that the sheets are folded along the edges of the bonded node lines and the portions not bonded are extended in the direction of the tensile force to separate the sheets from each other.

The expanded honeycomb is then placed in an impregnating bath containing a solution of phenolic resin PLYOPHEN 23900 from the Durez Corporation. After impregnating with resin, the honeycomb is taken out from the bath and is dried in a drying furnace using hot air. The honeycomb is heated from room temperature to 82° C. in this manner and then this temperature is maintained for 15 minutes. The temperature is then increased to 121° C. and this temperature is maintained for another 15 minutes, followed by increasing the temperature to 182° C. and holding at this temperature for 60 minutes. After that, the impregnation and drying processes are repeated once more. The final honeycomb has a bulk density of about 40 kg/m$^3$.

EXAMPLE 2

An aramid/thermoplastic paper having a composition of 50 weight percent para-aramid floc and 50 weight percent aliphatic polyamide floc is formed on conventional wet-lay paper forming equipment with a drying section consisting of a thru-air dryer operating at an air temperature of about 260° C. The paper therefore contains 50 weight percent PPD-T fiber and 50 weight percent aliphatic polyamide binder. The para-aramid floc and aliphatic polyamide floc are the same as in Example 1. After forming, the paper is calendered as in Example 1.

The final paper has a basis weight of 85 g/m$^2$ and thickness 4.0 mils (102 micrometers). An average value of its specific tensile index between machine and cross direction of the sheet is 75 (lb./in.)/(opsy)=390 N*m/g.

Node lines of same adhesive of Example 1 are applied to the paper surface as in that example, except the lines are applied at a width of 2.67 mm and a pitch of 8.0 mm. The steps of Example 1 are repeated to expand the honeycomb. No thermoset resin is applied. The final honeycomb has a bulk density of about 52 kg/m$^3$.

The invention claimed is:

1. A honeycomb having cells separated by cell walls, the cells being expanded wet-laid paper sheets bonded to each other along a number of nodes lines of adhesive, the cell walls comprising paper having an average specific tensile index of 60 (lbs/in)/opsy (310 Nm/g) or greater;

the paper comprising 3 to 30 parts by weight thermoplastic aliphatic polyamide binder having a melting point of from 120° C. to 350° C. and 70 to 97 parts by weight poly(paraphenylene terephthalamide) fiber, in the form of a floc or pulp or a mixture thereof, having a modulus of 600 grams per denier (550 grams per dtex) or greater, based on the total amount of aliphatic polyamide binder and PPD-T fiber in the paper; the aliphatic polyamide binder being present in the paper in the form of discrete film-like particles; the honeycomb further comprising a matrix resin that is a thermoset resin that fully impregnates, saturates, and/or coats the cell walls and fills voids in the paper.

2. The honeycomb of claim 1 wherein the paper has an average specific tensile index of 75 (lbs/in)/opsy (390 Nm/g) or greater.

3. The honeycomb of claim 1 wherein the poly(paraphenylene terephthalamide) fiber is present in an amount of from 80 to 97 parts by weight.

4. The honeycomb of claim 1 wherein the aliphatic polyamide binder is present in an amount of from 3 to 20 parts by weight.

5. The honeycomb of claim 1 wherein the aliphatic polyamide comprises nylon 610, nylon 6, nylon 66, or mixtures thereof.

6. The honeycomb of claim 1 wherein the paper without thermoset resin has a Gurley porosity of from 2 to 20 seconds.

7. An article comprising the honeycomb of claim 1.

8. An aerodynamic structure comprising the honeycomb of claim 1.

9. A panel comprising the honeycomb of claim 1 and a facesheet attached to a face of the honeycomb, wherein the cells of the honeycomb are sealed by the facesheet.

\* \* \* \* \*